United States Patent [19]
Yoshida

[11] Patent Number: 4,996,592
[45] Date of Patent: Feb. 26, 1991

[54] VIDEO COMMUNICATION APPARATUS CAPABLE OF ELECTRONICALLY ADJUSTING THE FIELD OF VIEW OF A VIDEO FRAME

[75] Inventor: Tetsuo Yoshida, Tokyo, Japan

[73] Assignee: Oki Electric Industry Co., Ltd., Tokyo, Japan

[21] Appl. No.: 391,877

[22] Filed: Aug. 10, 1989

[30] Foreign Application Priority Data

Aug. 12, 1988 [JP] Japan ................................. 63-200121

[51] Int. Cl.[5] .......................... H04N 3/22; H04N 7/15
[52] U.S. Cl. ...................................... 358/85; 358/180; 358/183; 358/185; 358/22; 379/54; 379/202
[58] Field of Search ................. 358/180, 183, 85, 126, 358/125, 22, 185; 379/202, 204, 205, 53, 54

[56] References Cited

U.S. PATENT DOCUMENTS

| | | | |
|---|---|---|---|
| 4,264,928 | 4/1981 | Schober | 379/53 |
| 4,405,940 | 9/1983 | Woolfson et al. | 358/126 |
| 4,494,144 | 1/1985 | Brown | 358/85 |
| 4,644,405 | 2/1987 | Roy et al. | 358/180 |
| 4,740,839 | 4/1988 | Phillips | 358/180 |
| 4,792,856 | 12/1988 | Shiratsuchi | 358/180 |

FOREIGN PATENT DOCUMENTS 0320828 6/1989 European Pat. Off. .
208184 7/1985 Japan .
029985 9/1987 Japan .

OTHER PUBLICATIONS

OKI Technical Review 126 vol. 53, pp. 16–23, Apr., 1987.

Primary Examiner—Tommy P. Chin
Attorney, Agent, or Firm—Spencer & Frank

[57] ABSTRACT

A video communication apparatus for encoding a video signal representative of a scene being picked up by a video camera and transmitting the encoded signal. The apparatus generates, in response to a synchronizing signal synchronous to the video signal, signals representative of a predetermined pick-up area to be encoded which is smaller than the entire pick-up area being picked up by the video camera, and a signal representative of a position of the predetermined pick-up area in the entire pick-up area. These signals mark the predetermined pick-up area with the entire pick-up area. A memory stores video data associated with either one of the entire pick-up area and the predetermined pick-up area.

9 Claims, 5 Drawing Sheets

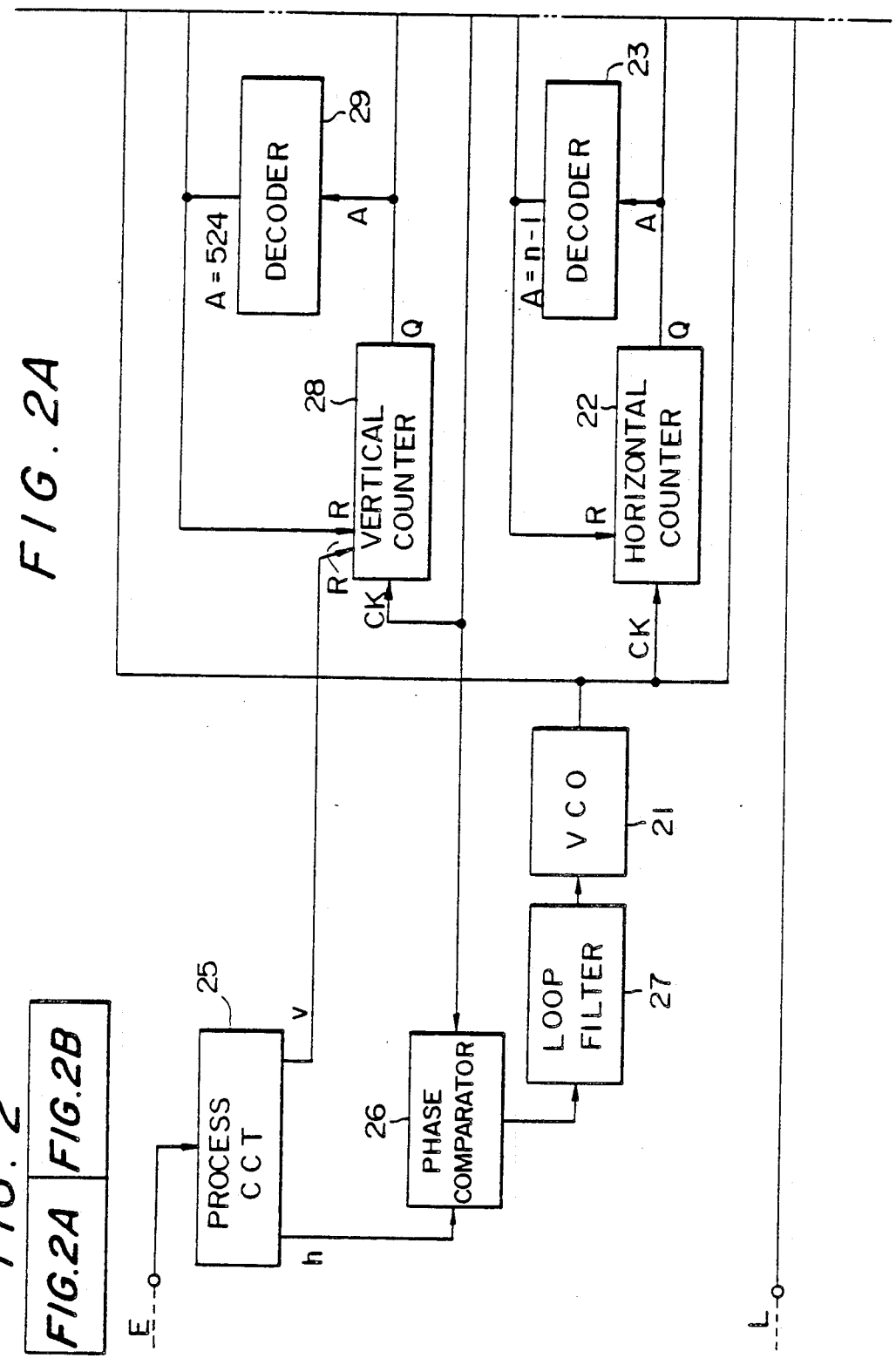

VIDEO COMMUNICATION APPARATUS CAPABLE OF ELECTRONICALLY ADJUSTING THE FIELD OF VIEW OF A VIDEO FRAME

BACKGROUND OF THE INVENTION

1. Field of the Invention

The present invention relates to a television (TV) conference system, TV telephone or similar video communication apparatus.

2. Description of the Prior Art

In the video communication apparatuses art to which the present invention pertains, it is often required that every participant attending a TV conference be picked up in an adequate image size and at an adequate position on the screen of a display device. An implementation elaborated to meet this requirement in relation to TV conferences is disclosed in Japanese Laid-Open Patent Publication (Kokai) No. 208184/1985.

The implementation disclosed in the above-mentioned Laid-Open Patent Publication uses two exclusive cameras, i.e., one for extracting contours only and the other for shooting individual participants in a conference. An electrically driven zoom lens and a motor French mount are mounted on the second-mentioned camera. The first-mentioned camera for extracting contours picks up the background of a conference room without participants, and the entire scene in which participants are seated. The background image and the entire image inclusive of the participants are switched over by a switch and stored in independent memories. A differential circuit produces a differential between the background image and the entire image or participant image to thereby remove the background. The resulting video signal representative of the participants only is fed to a contour extracting circuit, whereby the contours of individual participants are extracted. A vertical correlation circuit receives a contour signal from the contour extracting circuit and in turn produces a seat signal which shows the positions where the participants are seated. In response to the seat signal, the zooming of the zoom lens and the pan and tilt of the motor French mount which are mounted on the entire scene pick-up camera are adjusted, thereby shooting each of the participants in an adequate size and an adequate position.

A drawback of the prior art apparatus discussed above is that the motor French mount and other mechanically movable parts are essential to the adjustment of the area to be picked up, resulting in a bulky and expensive construction. Even with a TV telephone, the camera has to be adjusted in pointing mechanically by hand to match it to the person's sitting height or the position of a chair, or the TV telephone itself has to be provided with an oscillatable structure. Hence, it is impracticable to fix the camera in place within a hermetic casing or to fix the TV telephone itself in a desired position.

SUMMARY OF THE INVENTION

It is therefore an object of the present invention to provide a video communication apparatus capable of adjusting the position of a predetermined pick-up area fully electronically within the entire pick-up area.

In accordance with the present invention, a video communication apparatus for converting an analog video signal representative of a scene being picked up by a video camera into a digital signal, encoding the digital signal, and transmitting the encoded signal includes a timing generating circuit for generating, in response to a synchronizing signal synchronous to the video signal, signals representative of a predetermined pick-up area to be encoded which is smaller than the entire pick-up area being picked up by the video camera, and a signal for shifting the position of the predetermined pick-up area within the entire pick-up area. A memory stores video data associated with the predetermined pick-up area therein. A control circuit controls, in response to the output signals of the timing generating circuit, the writing and reading operations of the memory. The control circuit electronically adjusts the position of the predetermined pick-up area to be encoded in response to the output signals of the timing generating circuit.

Further, in accordance with the present invention, a video communication apparatus for converting an analog video signal representative of a scene being picked up by a video camera into a digital signal, encoding the digital signal, and transmitting the encoded signal includes a timing generating circuit for generating, in response to a synchronizing signal synchronous to the video signal, signals representative of the entire pick-up area being picked up by the video camera. A memory stores video data associated with the entire pick-up area therein. A control circuit controls the memory such that video data associated with a predetermined pick-up area to be encoded which is smaller than the entire pick-up area are read out of the memory. A reference data generating circuit generates reference data for shifting the position of the predetermined pick-up area. The control means electronically adjusts the predetermined pick-up area to be encoded in response to the outputs of the timing signal generating circuit and the reference data from the reference data generating circuit.

BRIEF DESCRIPTION OF THE DRAWINGS

The objects and features of the present invention will become more apparent from the consideration of the following detailed description taken in conjunction with the accompanying drawings in which:

FIGS. 2A and 2B are schematic block diagrams showing, when combined as shown in FIG. 2, a specific construction of a timing generating circuit which is included in the embodiment of FIg. 1;

DESCRIPTION OF THE PREFERRED EMBODIMENTS

Figure 1:
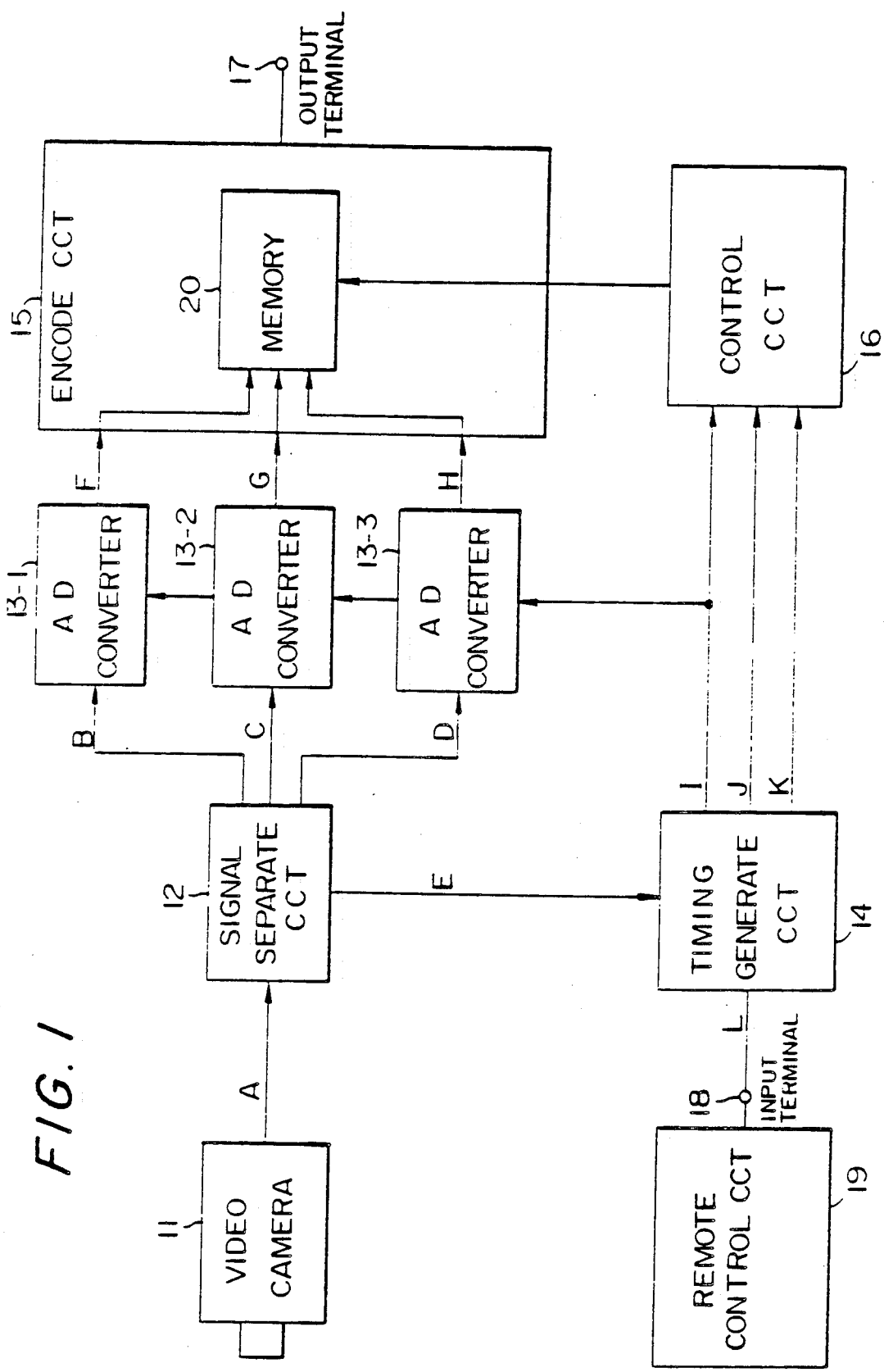
FIG. 1 is a schematic block diagram showing a preferred embodiment of the video communication apparatus in accordance with the present invention.

Referring to FIG. 1 of the drawings, a video communication apparatus embodying the present invention is shown in a schematic block diagram. As shown, the apparatus has a video camera 11 for picking up an image, and a signal separating circuit 12. Receiving a composite video signal A from the video camera 11, the signal separating circuit 12 separates a composite synchronizing signal E, a luminance signal B, and two different kinds of chrominance signals C and D from each other. The composite video signal A has an NTSC (National Television System Committee) format. The luminance signal B and chrominance signals C and D are fed to analog-to-digital (AD) converters 13-1, 13-2 and 13-3, respectively, while the synchronizing signal E is applied to a timing signal generating circuit 14. The timing signal generating circuit 14 generates a clock I for defining sampling timings, a frame timing signal J, and an image effective timing signal K, on the basis of the composite synchronizing signal E. Digital outputs F, G and H of the AD converters 13-1, 13-2 and 13-3, respectively, are fed to an encoding circuit 15. The encoding circuit 15 has a memory 20 therein which is to be loaded with the digital data F, G and H. A control circuit 16 controls the encoding circuit 15. The encoding circuit 15 produces encoded data on an output terminal 17. A remote control circuit 19 generates a signal L for controlling the position of an area to be picked up, i.e. a pick-up area control signal. The pick-up area control signal L from the remote control circuit 19 is applied to an input terminal 18.

In operation, a composite video signal A from the video camera 11 which is representative of a scene being picked up is decomposed by the separating circuit 12 into a luminance signal B, a chrominance component signals C and D, and a composite synchronizing signal E, as stated earlier. The luminance signal B and chrominance signals C and D are converted into digital data F, G and H by the AD converters 13-1, 13-2 and 13-3, respectively. In response to a control signal from the control circuit 16, the encoding circuit 15 loads the memory 20 thereof with only a part of the digital data F, G and H which is associated with a predetermined pick-up area smaller than the entire pick-up area. The stored data are encoded and then fed out via the output terminal 17.

Receiving the composite synchronizing signal E, the timing generating circuit 14 produces a clock I for defining sampling timings, a vertical image effective timing signal J, and a horizontal image effective timing signal K. The timing signals J and K are adapted to cause a predetermined pick-up area which is smaller than the entire pick up area to be stored and encoded, as stated above. The predetermined pick-up area is shiftable in response to the pick-up area control signal L. The encoding circuit 15 writes the signals F, G and H representative of a part of the image in the memory 20 on the basis of the signals I, J and K which are routed to the control circuit 16. The partial image written in the memory 20 is read out, then encoded, and then fed out to a transmission path via the output terminal 17.

Figure 2B:
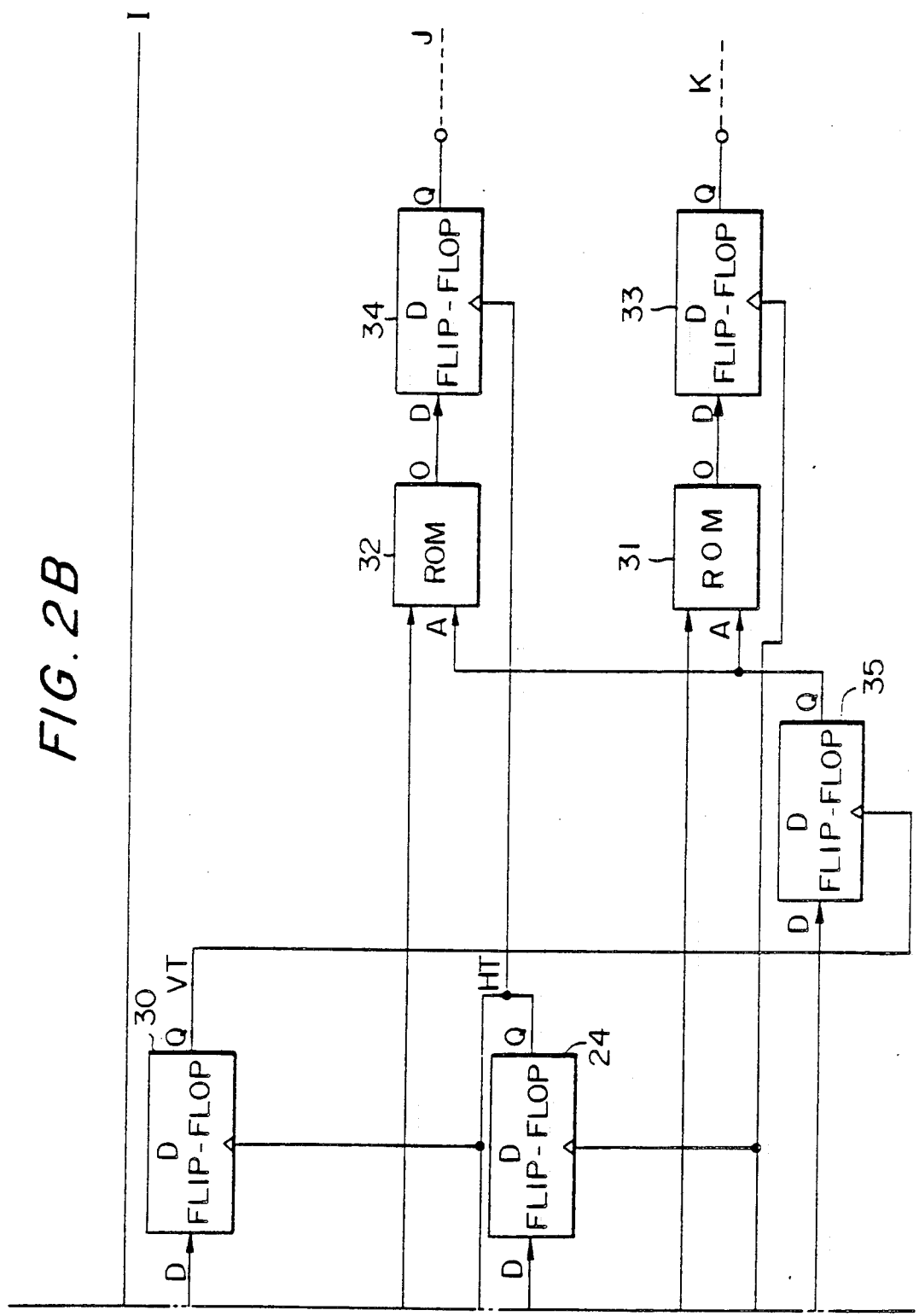

FIGS. 2A and 2B are schematic diagrams showing a specific construction of the timing generating circuit 14. In the figures, signals E, L, I, J and K appearing on respective terminals are the same as the signals which are indicated by the corresponding labels in FIG. 1. As shown, the timing generator 14 has a voltage controlled oscillator (VCO) 21 and a horizontal counter 22. The output of the VCO 21 plays the role of two different signals at the same time, i.e., the previously mentioned clock signal I which provides sampling timings and a clock which is applied to the horizontal counter 22 for counting pixels in the horizontal direction.

A decoder 23 produces an output when the horizontal counter 22 counts up (n31 1). The horizontal counter 22 is reset when it receives the output of the decoder 23 at a synchronous clear terminal R thereof. The output of the decoder 23 is also coupled to a flip-flop 24 having an output terminal Q. Hence, a horizontal timing signal HT in the form of a waveform-shaped pulse appears on the output terminal Q of the flip-flop 24 once per n consecutive pixels.

A processing circuit 25 receives the composite synchronizing signal E and in turn produces a horizontal synchronizing timing signal h and a vertical synchronizing timing signal v. A phase comparator 26 compares the horizontal synchronizing timing signal h and the previously mentioned pulse signal HT with respect to the phase. The phase comparator 26 forms a phase locked loop (PLL) in cooperation with a loop filter 27 and the VCO 21, i.e., the output frequency of the VCO 21 is so controlled as to maintain the signals h and HT in the same phase via the loop filter 27. The PLL, therefore, allows the timings of the signal HT and the resetting timings of the horizontal counter 22 to coincide with the horizontal synchronizing timing signal h. The horizontal counter 22 counts pulses as if it divides one line period into n equal segments. Hence, the count of the horizontal counter 22 precisely corresponds to a pixel position as counted in the horizontal direction.

A vertical counter 28 counts the pulses of the signal HT, i.e., scanning lines. A decoder 29 produces an output when the vertical counter 28 reaches a count of "524∞". The output of the decoder 29 is routed to a synchronous clear terminal R of the vertical counter 28 to reset the counter 28.

The vertical synchronizing timing signal v appears once for each frame, i.e., only at the beginning of an even field as distinguished from an odd field. The vertical synchronizing timing signal v is applied to the synchronous clear terminal R of the vertical counter, which counts "0" to "524", together with the decoder output which appears when "524" is reached. Since these two resetting signals are coincident, a signal VT on an output terminal Q of a D flip-flop 30 serves as a frame timing signal which appears at the beginning of an even field only. Therefore, the output count of the vertical counter 28 is associated with the position as measured in the vertical direction, i.e., the scanning line number inclusive of the distinction of fields. More specifically, the D flip-flop 30 produces a waveform-shaped pulse, i.e., the frame timing signal VT once for each frame. It follows that the output Q of the horizontal counter 22 and the output Q of the vertical counter 28 are representative of positions of video data being picked up or their digitized signals F, G and H on the screen.

A ROM 31 has addresses to a part of which the output of the horizontal counter 22 is applied. The ROM 31 is so programmed as to produce a (logical) ONE continuously over a predetermined range of counts of the horizontal counter 22. ONEs in the predetermined range are representative of an effective range as measured in the horizontal direction. This information is fed to a D flip-flop 33 which follows the ROM 31. In response, the D flip-flop 33 produces a signal indicative of the beginning and end of the predetermined range of counts of the horizontal counter 22 in the form of the horizontal image effective timing signal K, the signal K being applied to the control circuit 16. The pick-up area control signal L outputted by the remote control circuit 19 as stated earlier is routed through the input terminal 18 and a flip-flop 35 to other addresses of the ROM 31. The ROM 31 is programmed such that the above-mentioned predetermined area, i.e., the effective pick-up area in the horizontal direction is shiftable in response to the pick-up area control signal L.

A ROM 32 has addresses to a part of which the count from the vertical counter 28 is applied. The ROM 32 is programmed to produce a ONE over a predetermined range of counts of the vertical counter 28. In this case, ONEs appearing in the predetermined range is representative of effective scanning lines, i.e., an effective area as measured in the vertical direction. This information is fed to a D flip-flop 34 which follows the ROM 32. In response, the flip-flop 34 delivers to the control circuit 16 a signal which shows the beginning and end of a predetermined range of counts of the vertical counter 28, in the form of the vertical image effective timing signal J. The pick-up area control signal L from the remote control circuit 19 is fed to other addresses of the ROM 32 also, via the input terminal 18 and flip-flop 35. The ROM 32 is programmed such that the predetermined area, i.e., the effective pick-up area in the vertical direction is shiftable in response to the pick-up area control signal L.

Figure 3:
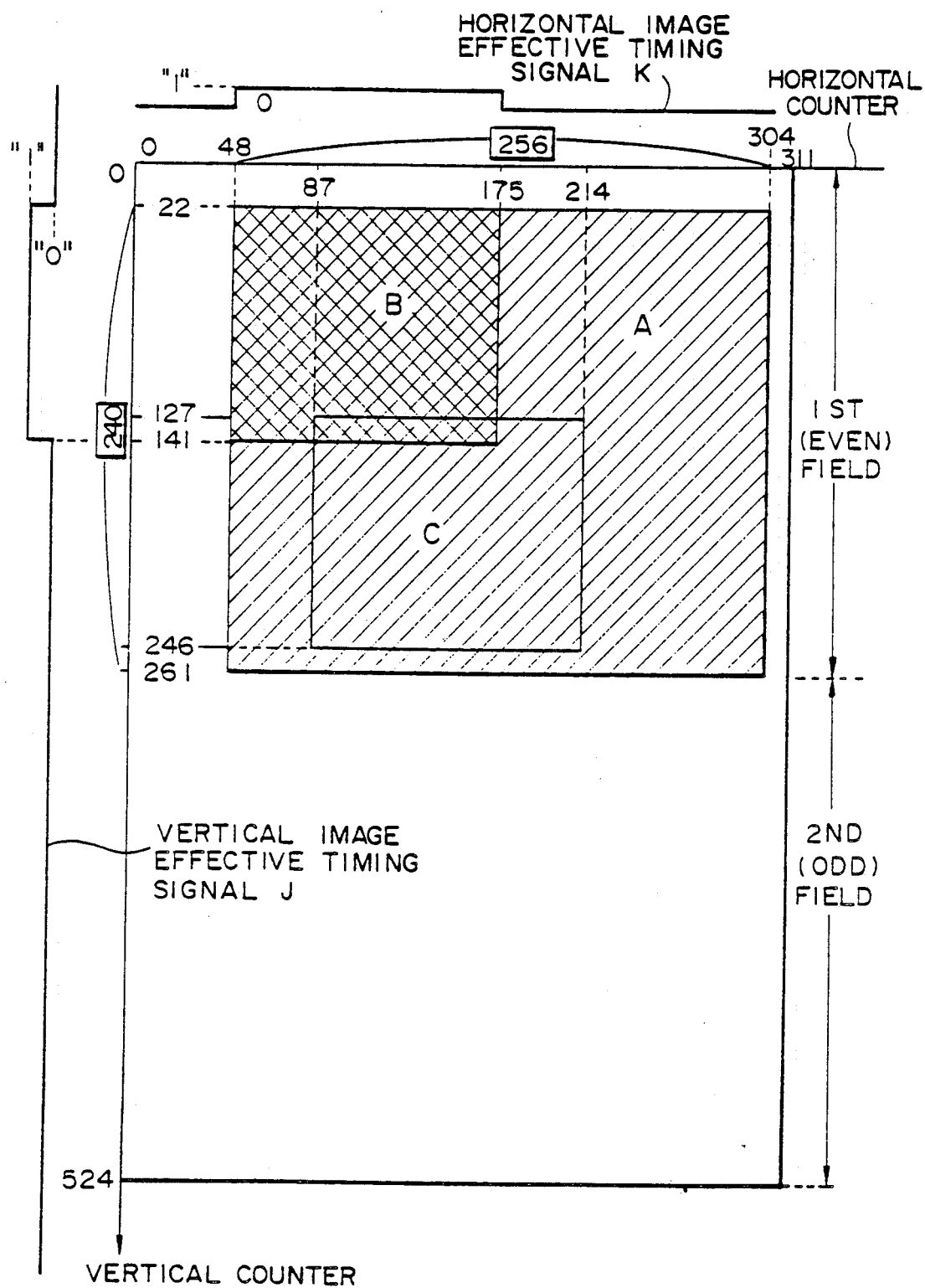
FIG. 3 is a diagram useful for understanding a procedure for changing the position of a predetermined pick-up area within the entire pick-up area in accordance with the present invention.

A reference will be made to FIG. 3 for describing a procedure for adjusting the image pick-up area, which is to be encoded, such that the effective ranges in the horizontal and vertical directions are variable. To better understand the procedure, assume that the vertical counter 28 starts counting just at position "0" of the first field as shown in FIG. 3. Also, assume that the video camera 11 has ordinary design specifications inclusive of resolution and, therefore, the sampling timing clock has 312 times (n=312) higher frequency than the horizontal timing. In the figure, an area A containing 128 pixels in the horizontal direction and 120 scanning lines in the vertical direction as indicated by hatching is the pixel range of the first field.

The operation associated with the first field is as follows. Assume a system which encodes and transmits video data of 128 pixels by 120 lines, e.g. an area B shown in FIG. 3. Then, the ROM 31 is programmed such that it produces a ONE while the horizontal counter 22 counts pixels "48" to "175", as represented by the signal K at the top of FIG. 3. On the other hand, the ROM 32 is programmed such that it produces a ONE while the vertical counter 28 counts scanning lines "22" to "141", as represented by the signal J at the left-hand side of FIG. 3.

Each of the signals J and K generated as stated above is applied to a count enable terminal of an address counter, not shown, which is included in the control circuit 16. In response, the control circuit 16 produces a write control signal for controlling the encoding circuit 15. As a result, the encoding circuit 15 loads its memory 15 with the data associated with the marked area B of the first field, and then encodes and transmits them.

Likewise, when the ROM 31 produces a ONE over the range of pixels "87" to "214" and the ROM 32 produces a ONE over the range of scanning lines "127" to "246", a marked range C shown in FIG. 3 will be encoded and transmitted. In this manner, by so programming the ROMs 31 and 32 as to produce some different kinds of output patterns one at a time in response to the pick-up area control signal L, it is possible to select any part of the entire hatched area A which contains 128 pixels in the horizontal direction and 120 scanning lines in the vertical direction.

Figure 4:
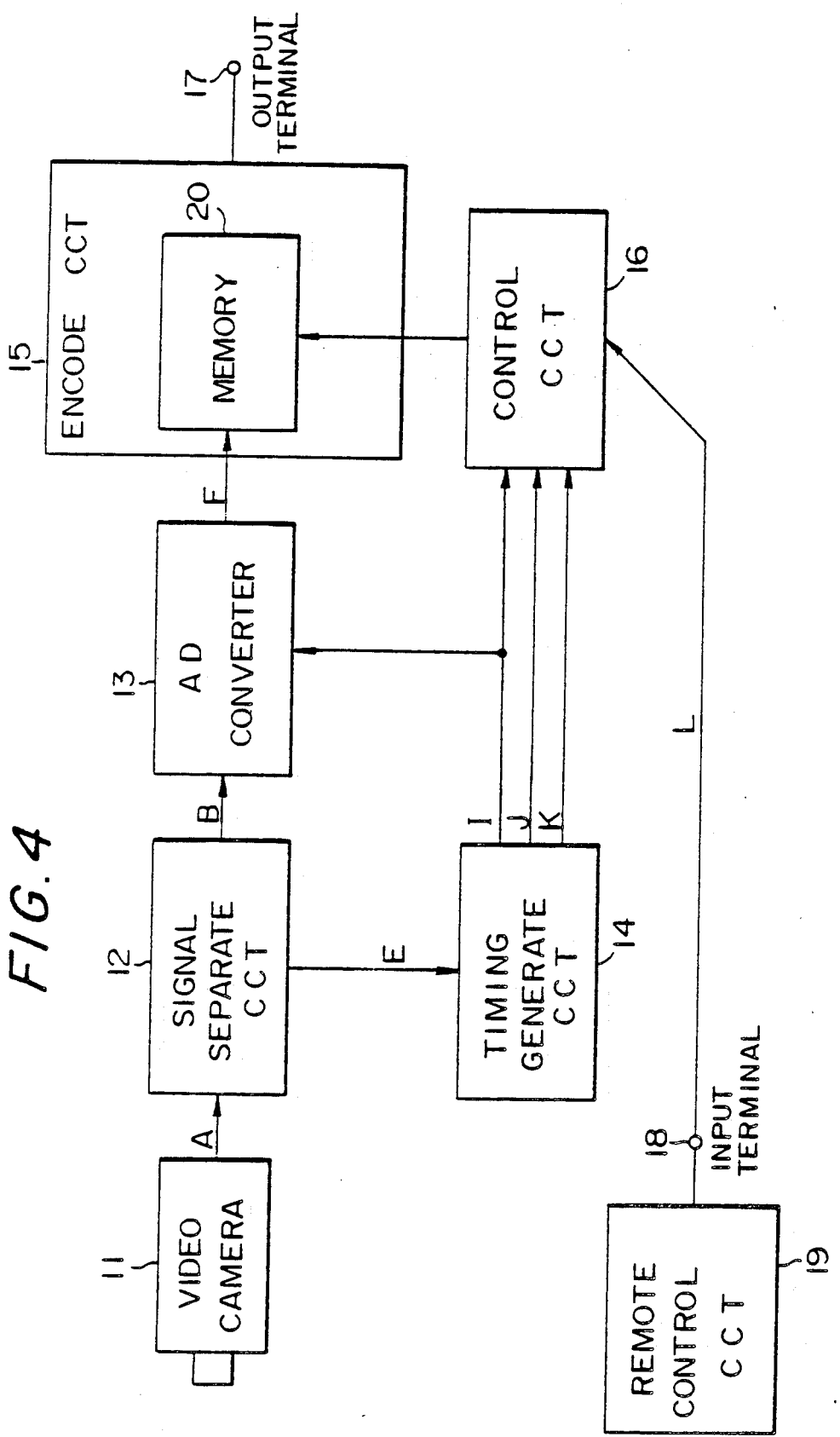
FIG. 4 is a schematic block diagram showing an alternative embodiment of the present invention.

Referring to FIG. 4, an alternative embodiment of the video communication apparatus in accordance with the present invention is shown. In the figures, similar components and structural elements are designated by the same reference numerals, and redundant description will be omitted for simplicity. This alternative embodiment is essentially similar to the embodiment of FIG. 1 except for the remote control circuit 19 the output of which is directly coupled to the control circuit 16 via the input terminal 18. Therefore, the timing generating circuit 14 shown in FIG. 4 is not controlled by he output of the remote control circuit 19.

The operation of the illustrative embodiment will be described in relation to a system which handles monochromatic images by way of example. A video signal A from the video camera 11 representative of a scene being picked up is applied to the signal separating circuit 12 to separate a luminance signal B and a composite synchronizing signal E from the signal A. The control circuit 16 controls the memory 20 of the encoding circuit 15 in response to the sampling timing clock I which is fed thereto from the timing generating circuit 14, so that all the video data representative of the scene being picked up by the video camera 11 are written in the memory 20 of the encoding circuit 15. The timing generating circuit 14 generates the vertical and horizontal image effective timing signals J and K which are representative of the entire area being picked up by the camera 11. The control circuit 16 generates addresses for allowing only the video data lying in a predetermined pick-up area smaller than the entire pick-up area to be read out of the memory 20 and encoded. These addresses generated by the control circuit 16 are shiftable in response to the pick-up area control signal L which is routed to the control circuit 16 via the input terminal 18.

The embodiment of FIG. 4, like the embodiment of FIG. 1, is capable of shifting the position of video data to be encoded in both of the horizontal and vertical directions on the basis of the output of the remote control circuit 19, thereby changing the predetermined pick-up area electronically. It is to be noted that the embodiment of FIG. 1 stores and encodes only the video data lying in the marked part of the entire area being picked up, while the embodiment of FIG. 4 stores all the video data being picked up and reads out and encodes only the video data which lie in a particular area.

The embodiments shown and described are implemented by a part of video data which are picked up by a video camera. This stems from the fact that ordinary video cameras have a resolution which is far higher than the resolution required of a TV telephone.

In summary, in accordance with the present invention, a video camera usable with a TV telephone, a TV conference system or similar video communications apparatus can pick up only a particular talker by having a particular pick-up area to be encoded shifted electronically, i.e., without resorting to a mechanical movable structure or a motor French mount otherwise needed for the fine adjustment of the camera in the horizontal and vertical directions.

The present invention, therefore, implements a small size, low cost and highly reliable TV telephone or TV conference system, for example. Since the position of the particular area to be picked up is controllable fully electronically and instantaneously without the need for mechanical members, convenient use of such a video communications system is promoted. Further, the procedure for changing the position of the predetermined pick-up area is included in an encoding algorithm to realize a further advantageous video communications system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video communication apparatus for converting an analog video signal representative of a scene being picked up by a video camera into a digital signal, encoding the digital signal, and transmitting the encoded signal, said apparatus comprising:
    signal generating means for generating, in response to a synchronizing signal synchronous to the video signal, output signals representative of a predetermined pick-up area to be encoded which is smaller than an entire pick-up area being picked up by the video camera, and for shifting a position of said predetermined pick-up area within said entire pick-up area;
    memory means for storing video data associated with the predetermined pick-up area; and
    control means for controlling, in response to the output signals of said signal generating means, writing and reading operations of said memory means to selectively write only the video data associated with the predetermined pick-up area in said memory means and read the video data from said memory means;
    said control means electronically adjusting the position of the predetermined pick-up area to be encoded in response to the output signals of said signal generating means.

2. An apparatus in accordance with claim 1, wherein said signal generating means includes:
    reference data generating means for generating reference data indicative of a position of the predetermined pick-up area within the entire pick-up area; and
    a timing signal generator having means, responsive to the reference data and the synchronizing signal, for generating as the output signals, signals representative of the dimensions and the position of the predetermined pick-up area, said control means being responsive to the output signals for electronically adjusting the video data written into the memory means to correspond to the dimensions and the position of the predetermined pick-up area.

3. An apparatus in accordance with claim 1 wherein said reference data generating means comprises a remote control circuit.

4. An apparatus in accordance with claim 3, wherein said signal generating means comprises:
    a vertical counter for counting video data of the video signal in a vertical direction; and
    a horizontal counter for counting the video data of the video signal in a horizontal direction;
    said timing generating means generating, in response to outputs of said vertical counter and said horizontal counter, a vertical image effective timing signal and a horizontal image effective timing signal which are representative of positions of the predetermined pick-up area as measured in the vertical direction and in the horizontal direction, respectively.

5. A video communication apparatus for converting an analog video signal representative of a scene being picked up by a video camera into digital data, encoding the digital data, and transmitting the encoded data, said apparatus comprising:
    means for converting the analog signal into digital data;
    signal generating means for generating, in response to a synchronizing signal synchronous to the video signal, signals representative of a selected pick-up area of the scene which is smaller than an entire pick-up area of the scene being picked up by the video camera;
    memory means for storing a portion of the digital data which is associated with the selected pick-up area;
    means for encoding the digital data stored in said memory means; and
    control means, responsive to the signals representative of the selected pick-up area, for controlling reading and writing operations of the memory means, including electronic adjustment of the position of the selected pick-up area relative to the entire pick-up area, to selectively write only the digital data associated with the predetermined pick-up area in said memory means and read the digital data from said memory means.

6. An apparatus in accordance with claim 5, wherein said signal generating means includes:
    reference data generating means for generating reference data indicative of a position of the selected pick-up area relative to the entire pick-up area; and
    a timing signal generator having means, responsive to the reference data and the synchronizing signal, for generating timing signals representative of the dimensions and the position of the selected pick-up area, the timing signals constituting the signals representative of the selected pick-up area of the scene.

7. An apparatus in accordance with claim 6, wherein said timing signal generator includes means for storing data indicative of the dimensions of the selected pick-up area.

8. An apparatus in accordance with claim 6, wherein said reference data generating means is a remote control circuit.

9. An apparatus in accordance with claim 8, wherein said timing signal generator includes:
    a vertical counter for counting video data of the video signal in a vertical direction; and
    a horizontal counter for counting video data of the video signal in a horizontal direction, said timing signal generator generating as said timing signals a vertical image effective timing signal and a horizontal image effective timing signal which are representative of positions of the selected pick-up area as measured in the vertical and horizontal directions, respectively.

* * * * *